M. C. SCHWAB.
ELEVATOR.
APPLICATION FILED APR. 22, 1910.

1,027,628.

Patented May 28, 1912.

Witnesses:

Inventor:
Martin C. Schwab
By his Attorney

M. C. SCHWAB.
ELEVATOR.
APPLICATION FILED APR. 22, 1910.

1,027,628.

Patented May 28, 1912.

M. C. SCHWAB.
ELEVATOR.
APPLICATION FILED APR. 22, 1910.

1,027,628.

Patented May 28, 1912.

Witnesses:

Inventor:
Martin C. Schwab
By Hopkins
His Attorney

UNITED STATES PATENT OFFICE.

MARTIN C. SCHWAB, OF CHICAGO, ILLINOIS.

ELEVATOR.

1,027,628.  Specification of Letters Patent.  Patented May 28, 1912.

Original application filed April 27, 1909, Serial No. 492,587. Divided and this application filed April 22, 1910. Serial No. 556,991.

*To all whom it may concern:*

Be it known that I, MARTIN C. SCHWAB, a citizen of the United States, residing at Chicago, in the county of Cook and State of Illinois, have invented certain new and useful Improvements in Elevators, of which the following is a specification.

This application is a division of my pending application filed April 27, 1909, Serial No. 492,587, and its subject matter was originally described and claimed in an application filed May 7, 1907, Serial No. 372,446.

The invention relates to mechanism for automatically stopping an elevator car or cars under certain hereinafter mentioned conditions.

All of the several novel features described in this application are applicable to that class of elevator apparatus in which a plurality of cars are arranged in the same shaft or well, one above the other, and are capable of moving both upward and downward therein, each car being capable of being operated entirely independently of the other, excepting when the automatic stopping mechanism is set in action by the approach of the cars to within a predetermined distance apart. Some of its novel features are applicable to this class of elevator apparatus only, and some, namely, those relating to the top and bottom limit-stop mechanism, are equally applicable to this class and also the class in which only a single car is operated in a single shaft or well.

The purpose of the present application is to cover and include in its claims only those novel features that are applicable only to an elevator system having a plurality of cars arranged in one and the same shaft, one above another, and I do not herein specifically claim any of those features which are equally applicable to such a system and to a system in which only a single car is arranged in a single shaft, regardless of the presence or absence of any other car in the same shaft, these latter features being covered and included in my aforesaid application of which this is a division.

In its broadest aspect, the invention is not concerned with the character or construction of the mechanism for counter-balancing, operating or controlling the car or cars, and while some of its features are thus equally applicable to all elevators, regardless of the construction of their operating or controlling mechanism, or the number of cars in each shaft, others are specifically applicable to elevators having electric controlling mechanism, while still others are specifically applicable to elevators having hydraulic operating and controlling mechanism. These latter are herein claimed only generically.

When two cars are operating in the same shaft it is desirable that automatic mechanism be provided for stopping them when they approach to within a predetermined distance apart, either when both are moving in the same direction or in opposite directions, or when one is standing still and the other is moving toward it, and this predetermined distance may be the distance between any desired number of floors,—say three. It is also desirable that each car shall be absolutely free to be operated entirely independently of the other, as if the latter were not present, excepting when the automatic stopping mechanism is in action. It is also desirable that even after the automatic stopping mechanism has acted, either car may be moved away from the other, excepting, of course, when the car to be moved is controlled by the limit stop, at the top or bottom of the well. It is also desirable that when the lower car is at its bottom limit, the mechanism for automatically stopping the descent of the upper car may be thrown out of action, either automatically or manually, in order to permit the upper car to descend to its bottom limit,—say to the first floor if the lower car is in the basement. It is also desirable that the upper car be automatically stopped at its bottom limit, before it strikes the lower car, and that the lower car be prevented from commencing its ascent until the upper car, in its ascent, has reached the third floor. It is also desirable that the upper and lower cars be automatically stopped when they reach their upper and lower limits, respectively. It is also desirable that the stopping of the cars upon coming with a predetermined distance apart be accomplished by the direct contact of suitable devices carried by the cars themselves. It is also desirable that all automatic stopping be accomplished by the direct contact of suitable devices one, at least, of which is carried by the car and one of which is capable of receding to permit the car, if running at high speed, to continue to move a short distance after the automatic stop mechanism has acted. It is also desirable, in the case of an electrically controlled elevator, that the automatic stopping of the car be accomplished by rendering the operator's controller-lever inoperative.

The object of the present invention is to provide means for accomplishing all of these desirable results and others hereinafter described, and to this end the invention consists in the features of novelty that are hereinafter described.

In the accompanying drawings, which are made a part of this specification: Fig. 1ª is a detail view showing a slight modification. Figs. 2ª and 3ª are details.

C' and C² represent the two elevator cars located in the same shaft or well and running upon a pair of guides 1. The means for counter-balancing and operating or propelling the cars are not shown in the drawings because they form no part of the present invention. Suffice it to say that they are so counter-balanced, and their operating mechanisms are of such construction, that, excepting as hereinafter described, each car may run both upward and downward in the shaft independently of the other car. This type of elevator is more particularly adapted for use in lofty buildings. It is the intention in practice, that the upper shall run as an express car, to, say the middle floor of the building and as a local car for the upper floors, while the lower car shall be run only to, say the middle floor of the building as a local car for the lower floors, but it is nevertheless desirable that the lower car may, if desired be used to serve the upper floors also. The operating mechanism for the cars may be of electric, hydraulic, or any other type, and if desired the upper and lower cars may be operated by mechanism of different types—say electric for the upper and hydraulic for the lower.

Figures 6, 7:
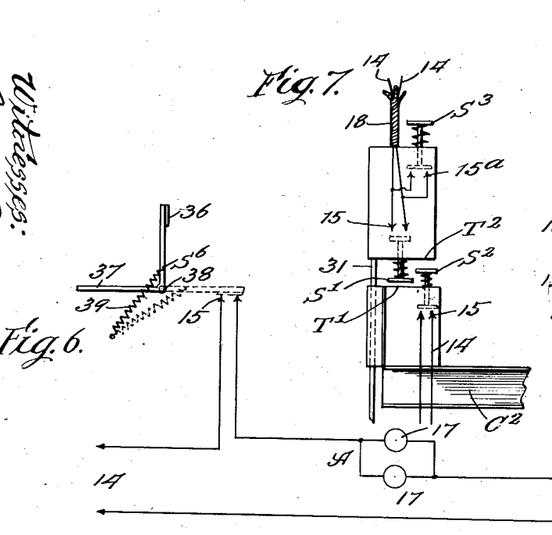
Fig. 6 is an enlarged diagrammatic representation of the switch of Fig. 4 and of the signal lamps, the controller, the circuit breaker and the circuit including them.
Fig. 7 is an enlarged elevation of the switches and other parts of the mechanism for preventing the cars from colliding and the bottom limit switch of the upper car.
Figure 8:
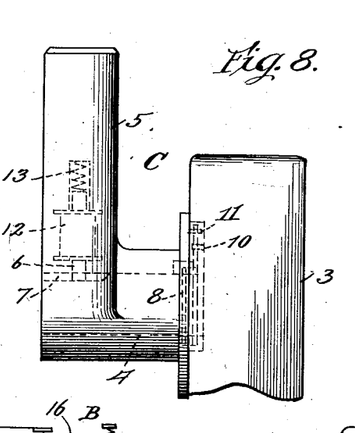
Fig. 8 is a side elevation, on a still larger scale, of the controller.
Figure 9:
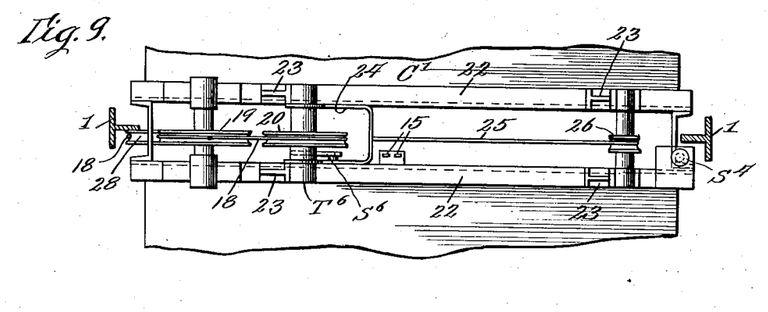
Fig. 9 is a plan view of the upper car shown in Fig. 4.

Each of the cars carries a controller, C, for a circuit, a portion of which is shown at 2, which includes an electro-receptive device of any suitable construction for controlling the motor mechanism, and the controller itself may be of any construction that will answer the requirements hereinafter described. The details in its construction are not shown in the drawings excepting in so far as it is necessary to show them in order to fully understand the invention. In Figs. 6 and 8 it is shown as having a suitable casing, 3, containing its mechanism which includes a projecting shaft, 4, upon which is mounted a lever 5, the shaft and lever being normally connected by a key, 6, carried by the lever and occupying a groove, 7, in the shaft. The shaft is held normally in position, and is returned thereto when unrestrained, by means of a spring, 8, the central portion of which is attached to the shaft at 9, the portions of the spring on the opposite sides of its point of attachment to the shaft being wrapped one or more times around the shaft and its ends crossed and carried off from the shaft at tangents, in the form of the letter V. A pin, 10, carried by the casing, 3, engages the ends of the spring at the crotch and limits their movement toward each other, while two pins, 11, carried by the lever, 5 also engage said ends, respectively. With this arrangement, when the lever is moved from its central position, one of its pins, 11, will engage one of the projecting ends of the spring and thereby put the spring under tension so that when the pressure upon the lever is released the spring will return it, and through it, will return the shaft 4, to central position. The key, 6, is in fact the core of a solenoid, 12, which is carried by the lever and said key is held normally in engagement with the groove of the shaft by a spring 13, but when the solenoid is energized it will withdraw the key from engagement with the shaft, so that the spring re-acting upon the shaft will restore it to central position. This is a practical means for normally connecting the lever and shaft and for disconnecting them upon the energizing of the solenoid, but I desire to have it understood that any other means for accomplishing these results may be substituted therefor and still be within the scope of the invention.

The circuit 14, which includes the solenoid extends to any suitable source of electrical energy, either carried by the car or off the car and includes an alarm or signaling device A, a circuit breaker B, and a pair of normally opened contacts 15, all of which are carried by the car. The circuit breaker may be of any desired construction and is provided with a push button 16, located within convenient reach of the operator so that he may open the circuit and de-energize the solenoid whenever he desires to reëstablish his control over the controller through the medium of the controller-lever. The device A, may be either an audible or a visual alarm or signal. Preferably it consists of a pair of lamps 17, arranged in multiple. The parts thus far described are duplicated on the two cars.

Figure 2:
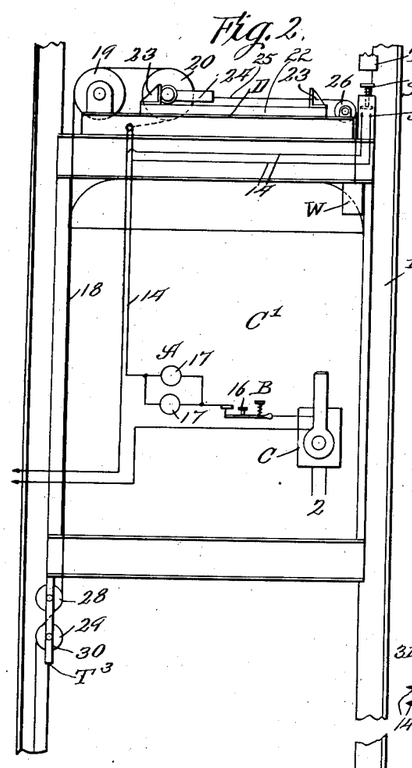
Figs. 2 and 3 are similar views, on a larger scale, of the upper and lower cars, respectively.
Figure 2A:
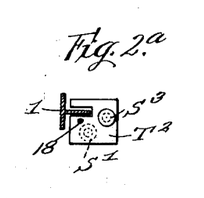

The contacts 15, of the upper cars are controlled by a switch $S'$, which is carried by a weight $T^2$ (which also performs the function of a tappet and is hereinafter so called when that function is concerned) and this weight is supported by a rope or cable 18 (preferably made of hemp) which passes over a stationary pulley 19 on the top of the car, thence over a traveling pulley 20 and has its end secured to the car as at 21. The shaft of the pulley 20 travels on tracks or ways 22 and is limited in its travel by stops 23. A yoke 24 engages the shaft of the pulley 20 and to it is connected one end of a cable 25 which passes over a fixed pulley 26 and carries at its other end a take-up weight W. This mechanism constitutes a differential take-up (D) for taking up the slack in the cable 18 when the downward movement of the weight $T^2$ is arrested and the upper car continues to move downward, or when the lower car lifts the weight $T^2$. It will be seen that with the arrangement shown the differential is two to one so that the take-up weight W, moves only one-half as far as the weight $T^2$, the object of this being to limit the travel of the weight W, to a distance not exceeding the height of the car, the intention being that this weight shall be contained within a hollow pilaster built in the car. In passing from the weight $T^2$ to the pulley 19, the cable 18 passes between two pulleys 28 and 29 which are supported by hangers 30 depending from the bottom of the car, the object being to hold the weight well to the side of the elevator shaft and permit it to travel close to the guide rail 1, the weight being preferably formed with a groove which receives the guide rail as shown in Fig. $2^a$. It will be understood that the cable 18 contains portions of the wires of the circuit 14 and that from the point 21 at which the cable is anchored to the car (or other part), the circuit runs to include the devices A, B, and C and the source. The weight $T^2$ is heavier than the weight W so that when not restrained the weight $T^2$ will hold the weight W in its uppermost position and will, itself, be held by the cable 18 at such a distance below the bottom of the upper car that when the two cars approach to within the aforesaid predetermined distance apart, (say three floors) the push button of the switch $S'$, will come in contact with the tappet $T'$ on the lower car, and thereby close the circuit 14 at the switch $S'$, thus energizing the solenoid of the controller C, of the upper car and disconnecting the controller-lever from its shaft, allowing the shaft to be returned to "stop" position. (The term "tappet" as used in this specification is intended to mean any part, or a surface of any part, of whatever name, which is adapted to strike or engage the push button or equivalent part of a switch for operating it.) The car may continue to travel some distance after the action last described takes place, with a tendency to slacken the cable 18, but this slack is instantly taken up by the take-up mechanism D.

Figure 1:
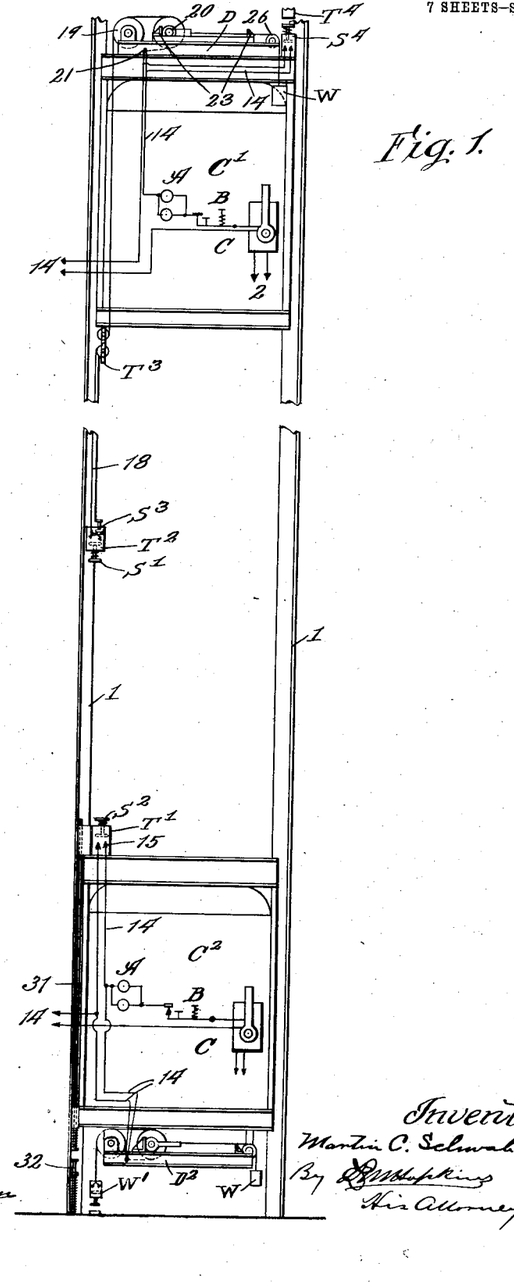
Figure 1 is a diagrammatic elevation of an electrically controlled elevator apparatus, having two cars in a single shaft, embodying the invention.

Assuming that the lower car is above its bottom limit, when the switch $S'$ contacts with the tappet $T'$, a similar switch $S^2$ on the lower car contacts with a tappet or contact surface on the weight $T^2$ and closes the circuit 14 of the lower car at the contacts 15, so that the solenoid of the lower car is operated in like manner and with a like result so that if both cars are in motion, both will be stopped, or if one is at rest the other will be stopped. As shown in Figs. 1, 2, 3 and 7, the buttons of the switches $S'$ and $S^2$ are arranged to pass each other as the tappets $T'$ and $T^2$ approach each other, so that the buttons of the switches contact directly with the tappets, but if desired they may be arranged directly in line with each other as shown in Fig. 1ª in which case the buttons will come in contact with each other and act as tappets for closing the switches.

With this construction and arrangement it will be seen that the cars are capable of being operated independently of each other, either upward or downward until they reach the aforesaid predetermined distance apart, whereupon their automatic stopping mechanism will be set in action, and the moving car or cars stopped. As before intimated, the cars may not, and in most cases will not, stop instantly and this makes it necessary to use a tappet that will recede relatively to the car or other part supporting it, and when this receding tappet is supported by a cable it becomes necessary to use take-up mechanism for drawing the slack out of the cable. The closing of the circuit 14 also operates the alarm or signal A and it will continue to operate until the circuit is again broken.

If the operator of either car desires to move his car he breaks the circuit at B and thereby is enabled to re-establish mechanical connection between the controller-lever and the controller shaft. When this is done he may move his car in either direction, but having been warned of the danger of moving it toward the other car he will naturally not do so, or, if it is necessary to do so, as it sometimes is, he will do so cautiously. An occasion for doing so may arise when the lower car is at its bottom limit and the upper car reaches the third floor. In this event, unless means such as are hereinafter described are provided for preventing it, the upper car will be automatically stopped at the third floor. In order to again start it and continue to the first floor it is simply necessary for the operator to open the circuit at B, and hold it open, and so long as this is done he may proceed downward until his car strikes the lower car. This would be the case with the arrangements shown in Figs. 4, 5 and 10 and also with the arrangements shown in Figs. 1, 2 and 3, if the mechanism now described were not used.

To prevent the stopping of the descent of the upper car at the third floor when the lower car is at its bottom limit, in the basement of the pit, a vertical rod 31 is mounted on the lower car so as to be capable of a limited vertical movement relatively thereto when the lower end of the rod comes in contact with the post 32 at the bottom of the well. The upper end of the rod is located directly in the path of the weight $T^2$ but in its normal or lowermost position its upper end does not project far enough above the lower car to contact with said weight. An instant before the lower car reaches its lower limit, the rod 31 comes in contact with the post 32 and the downward movement of the rod is stopped while the car continues downward to its lower limit. The effect of this relative movement of the car and rod is to cause the upper end of the rod to project above the car as shown in Fig. 7, far enough to engage the weight $T^2$ before the switch S' comes in contact with the tappet of the lower car, and thus the closing of the circuit 14 of the upper car at the switch S' is prevented. The weight $T^2$, being arrested, recedes relatively to the upper car, the slack in its supporting cable being taken up as already described, and the upper car may proceed downward until it is stopped either by the operator or by an automatic limit stop now to be described.

In addition to the terminal 15 the circuit 14 of the upper car has terminals $15^a$ carried by the weight $T^2$ and controlled by a switch $S^3$, the button of which is located at the top side of the weight $T^2$. The weight $T^2$ having been arrested by the rod 31 remains at rest and as the upper car reaches its lower limit (the first floor) a tappet $T^3$ carried by the upper car closes the circuit 14 at the switch $S^3$, resulting in the stopping of the upper car in the manner already described. When both cars are at their lower limits, the upper car may be started upward but the lower car cannot ascend any considerable distance while the upper car is at its lower limit, because even a slight upward movement of the lower car while the upper car is at its lower limit will bring the switch $S^2$ into contact with the weight $T^2$ and thereby close the circuit 14 of the lower car.

As the upper car approaches its upper limit a switch $S^4$ carried by it comes in contact with a tappet $T^4$ and closes the circuit 14 at contacts 33, thereby stopping the car in the manner already described. The tappet $T^4$ is in the form of a weight supported by a suspended cable $18^a$ and the slack in this cable is taken up by a differential take-up mechanism D' supported at the top of the shaft and constructed precisely like the take-up mechanism D, shown on the top of the car C; corresponding parts of the two take-up mechanisms being designated by similar reference numerals with the addition of the exponent (a) to the numerals applied to the parts of the take-up mechanism D' at the top of the shaft. Having reached its top limit in order to start the upper car downward, it is necessary to open its circuit 14 at B and hold it open until the switch $S^4$ has passed out of engagement with the tappet $T^4$.

In addition to the contacts 15 the circuit 14 of the lower car has contacts 34, (corresponding with the contacts 33) which are controlled by a switch $S^5$ carried by a weight $W'$ supported below the car by a rope or cable $18^b$ which rope or cable is in turn supported by differential take-up mechanism $D^2$ supported beneath the car and constructed precisely like the differential take-up mechanism $D$, similar parts of both being indicated by the same reference letters with the exponent $b$, added to the characters indicating the parts of the take-up mechanism $D^2$. When the car is about to reach its bottom limit the switch $S^5$ is closed by a tappet $T^5$ at the bottom of the well and closes the circuit 14. This forms a lower limit stop which operates in the manner already described with reference to the top limit stop. In order to start the lower car upward the circuit must be opened at B and held open until switch $S^5$ has moved out of engagement with the tappet $T^5$.

Figure 12:
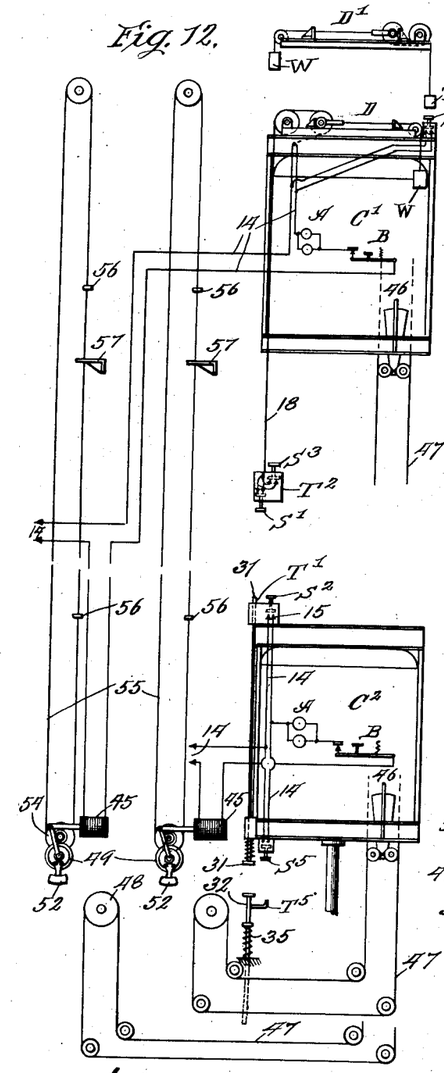
Fig. 12 is a diagrammatic elevation of two hydraulically operated and controlled cars showing the application of the invention thereto.

Instead of constructing the lower limit stop of the lower car as just described it may be constructed as shown in Fig. 12. In this figure the terminals 34, and the switch $S^5$ are carried by the car and the tappet $T^5$ is carried by the post 32 which is capable of moving vertically in a suitable socket and is held normally in its elevated position by a coiled spring 35, so that the tappet is capable of receding when struck.

Figures 4, 5:
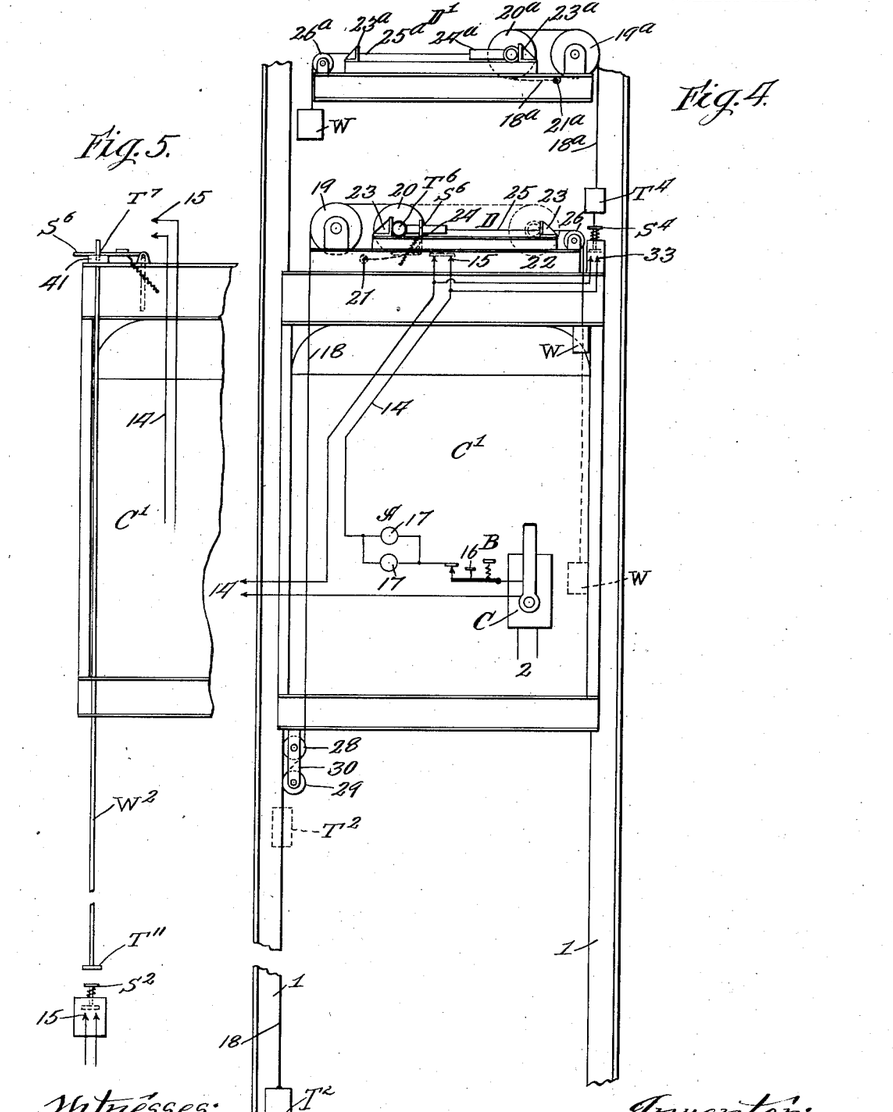
Fig. 4 is a similar view of the upper car, showing a modification in the construction of the switch and its operating mechanism.
Fig. 5 is a similar but fragmentary view showing a modification of the mechanism for operating the switch of Fig. 4.

In the form of the invention shown in Fig. 4, the contacts 15 of the upper car are carried directly by the car and are controlled by a trip switch $S^6$ which is more clearly shown in Fig. 6. It consists of two arms 36 and 37 disposed at right angles to each other and fulcrumed to a suitable part of the car at their junction 38. These arms are so located that one or the other of them at all times lies in the path of the shaft $T^6$ of the traveling pulley 20, which forms a tappet for striking that arm of the switch which is for the time being in its path and thereby throwing the switch in one direction for the purpose of closing the circuit 14 at the contacts 15, and in the other direction for the purpose of opening the circuit, an aiding spring 39 being provided for aiding the movement of the switch past its central position and yieldingly holding it either open or closed, as the case may be. It will be observed that when the movement of the weight $T^2$ is arrested the continued downward movement of the car $C'$ will permit the take-up weight W, to draw the traveling pulley 20 to the right (as shown in Fig. 4) and thereby take up the slack in the cable 18 and at the same time trip the switch $S^6$, so as to close the circuit 14 at the contacts 15, with the results already described. Upon a reversal of the movement of the upper car, or upon a downward movement of the lower car away from contact with the weight $T^2$, said weight will overcome the weight W and restore the parts to the positions shown in full lines in Fig. 4 and thereby again open the circuit 14 at the contacts 15.

In the form of the invention shown in Fig. 5, the cable and pulley take-up mechanism is dispensed with and in place thereof a weight in the form of a rod $W^2$ is used. This rod is supported by the car $C'$ through the medium of a collar 41, so as to be vertically movable relatively to the car and terminates at its lower end at about the same distance from the bottom of the car as does the cable 18. Its lower end constitutes a tappet $T''$ coöperating after the manner of the weight or tappet $T^2$ with the switch $S^2$ of the lower car for closing its circuit 14. Near the upper end it carries a tappet $T^7$ coöperating after the manner of the tappet $T^6$ for operating the switch $S^6$ of the upper car and closing it at the contacts 15.

Figure 10:
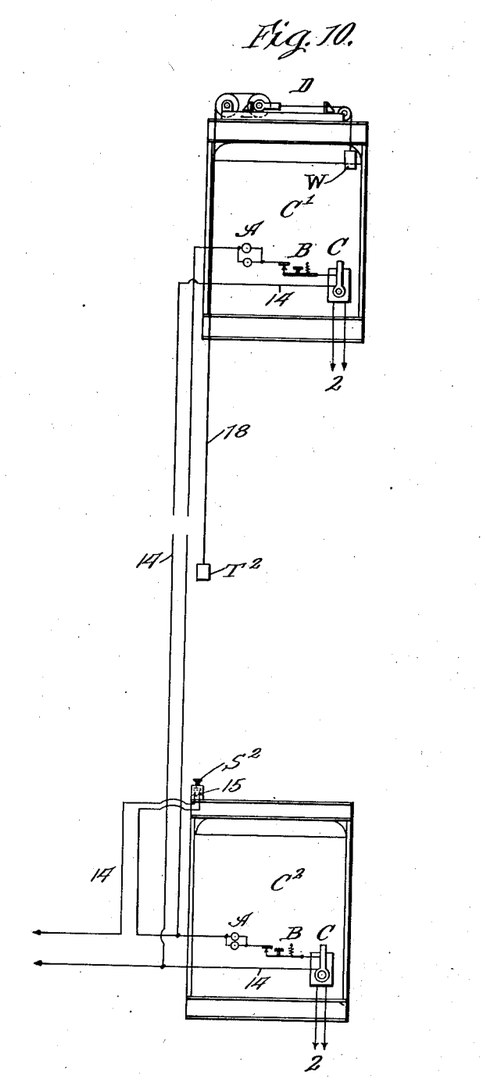
Fig. 10 is a diagrammatic elevation of the two electrically controlled cars showing the application of the invention, under another modification, to only the mechanism for preventing the cars from colliding.
Figure 11:
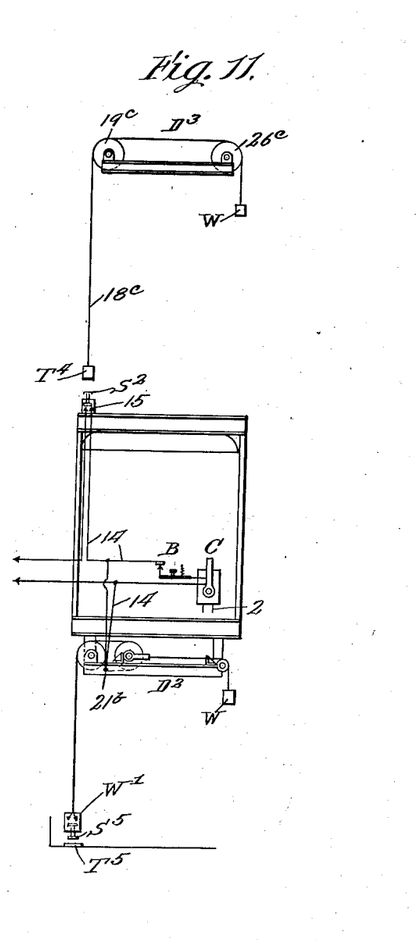
Fig. 11 is a diagrammatic elevation of a single electrically controlled car showing the application of the invention under another modification to only the limit-stop mechanism.

Figs. 1, 2, 3, 4 and 5 show arrangements in which the circuit 14 is provided with open contacts on each car and a switch on each car controlled by a tappet controlled or carried by the other car for operating said switch, while in Fig. 10 the circuit 14 is led to both cars and controlled by a single switch $S^2$ carried by the lower car and coöperating with the tappet $T^2$ carried by the upper car. This figure shows the invention in its application to only the mechanism for preventing the cars from colliding when they approach each other to within a predetermined distance apart, while Fig. 11 shows the invention applied only to the mechanism for stopping a single car at the top and bottom limits of its travel. The mechanism for stopping it at its bottom limit has already been described in connection with Fig. 3. That for stopping it at its top limit is constructed as shown in Fig. 4 excepting that the take-up mechanism $D^3$ is not differential, the tappet $T^4$ being carried by one end of the cable $18^c$ which passes over two fixed pulleys $19^c$ and $26^c$ and has the weight W, attached to its other end, the cable being passed one or more times around one of the pulleys in order to prevent its slipping.

The foregoing description assumes that the elevator car or cars may be operated by any type of motor the starting and stopping of which in the ordinary running of the elevator may be accomplished by any suitable form of electro-receptive device arranged in the circuit 2. This is what is known as an electrically controlled elevator, but the invention is equally applicable to a mechanically controlled elevator such, for example, as shown in Figs. 12 to 15 inclusive.

Figures 3, 3A:
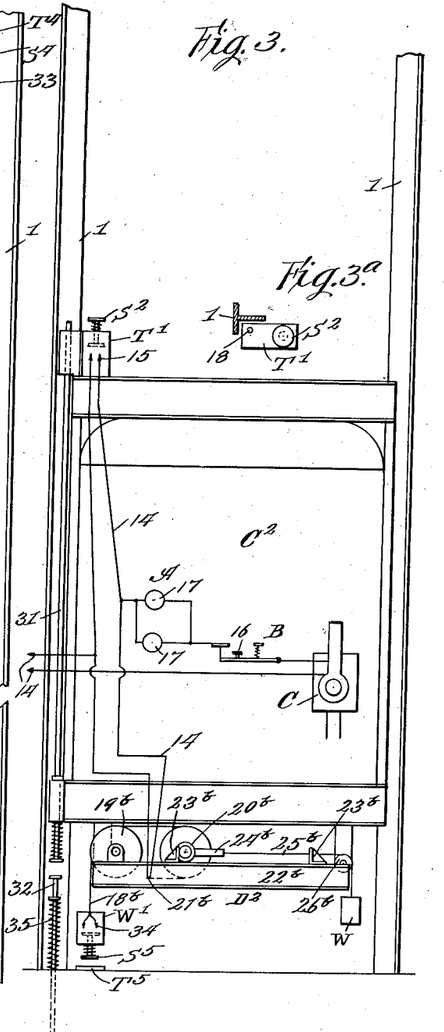

In Fig. 12, the cars are equipped precisely as shown in Figs. 1, 2 and 3, excepting that the solenoids in the circuit 14 are not arranged in operative relation to the controller levers but are arranged, as shown at 45 in operative relation to suitable valves of the hydraulic motors of the respective cars, the apparatus shown in this figure being equipped with hydraulic mechanism for operating the cars and mechanical mechanism for controlling them. Each of the cars is shown as being provided with a controller lever 46 for operating a cable 47 which embraces a sheave or pulley 48 which is suitably connected with a suitable valve of the hydraulic motor, all of which parts may be of customary or of any desired construction. The motor has also a limit stop valve 49 which is shown somewhat in detail in Figs. 15 and 16 and which is indicated diagrammatically in Figs. 12, 13 and 14. The valve proper (not shown in the drawings) has a shaft 50 to which is secured a gear wheel 51 the under side of which carries a weight 52 which holds the valve normally in its open position and returns it thereto when unrestrained. Meshing with the gear wheel 51 is a pinion 53 on the shaft of a drum pulley 56 around which passes the customary standing stop rope 55 having buttons 56 that are adapted to be engaged by an arm 57, which latter may be carried directly by the car or by the traveling sheave frame. Secured directly to the valve shaft 50 is a lever $56^a$ the end of which is connected by a link $57^a$ with the core 58 of the solenoid 45. With this arrangement it will be observed that in the absence of the automatic closing of the circuit 14, the stop valve 49 will operate in the customary manner for stopping the car at the top and bottom limits of its travel. It is also apparent that upon the automatic closing of the circuit 14, the solenoid 45 will be energized and the lever $56^a$ and other parts will be moved to the positions indicated by dotted lines in Fig. 15 thereby operating the valve 49 precisely as it would be operated by movement derived from the standing cable 55.

Figure 13:
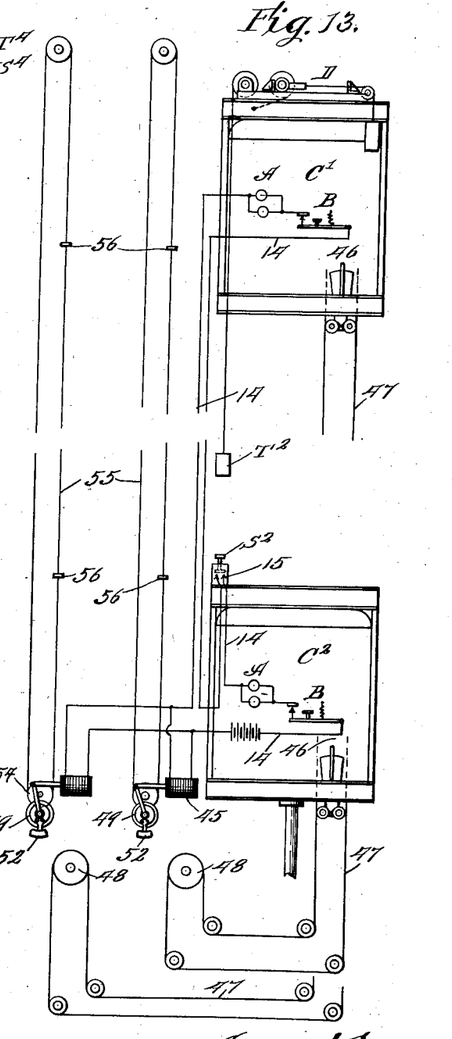
Fig. 13 is a similar view showing the application of the invention, under another modification, to only the mechanism for preventing the cars from colliding.

In the modification shown in Fig. 13 the invention is shown only in its application to the automatic mechanism for stopping the cars upon their approach to within a predetermined distance of each other, and the equipment for this purpose is substantially like that shown in Fig. 10, excepting that mechanical controllers 46 are substituted for electrical controllers C and the solenoids of the circuit 14 of the two cars are arranged in operative relation to suitable valves of the motors, instead of in operative relation to the controller-lever.

Figures 14, 15, 16:
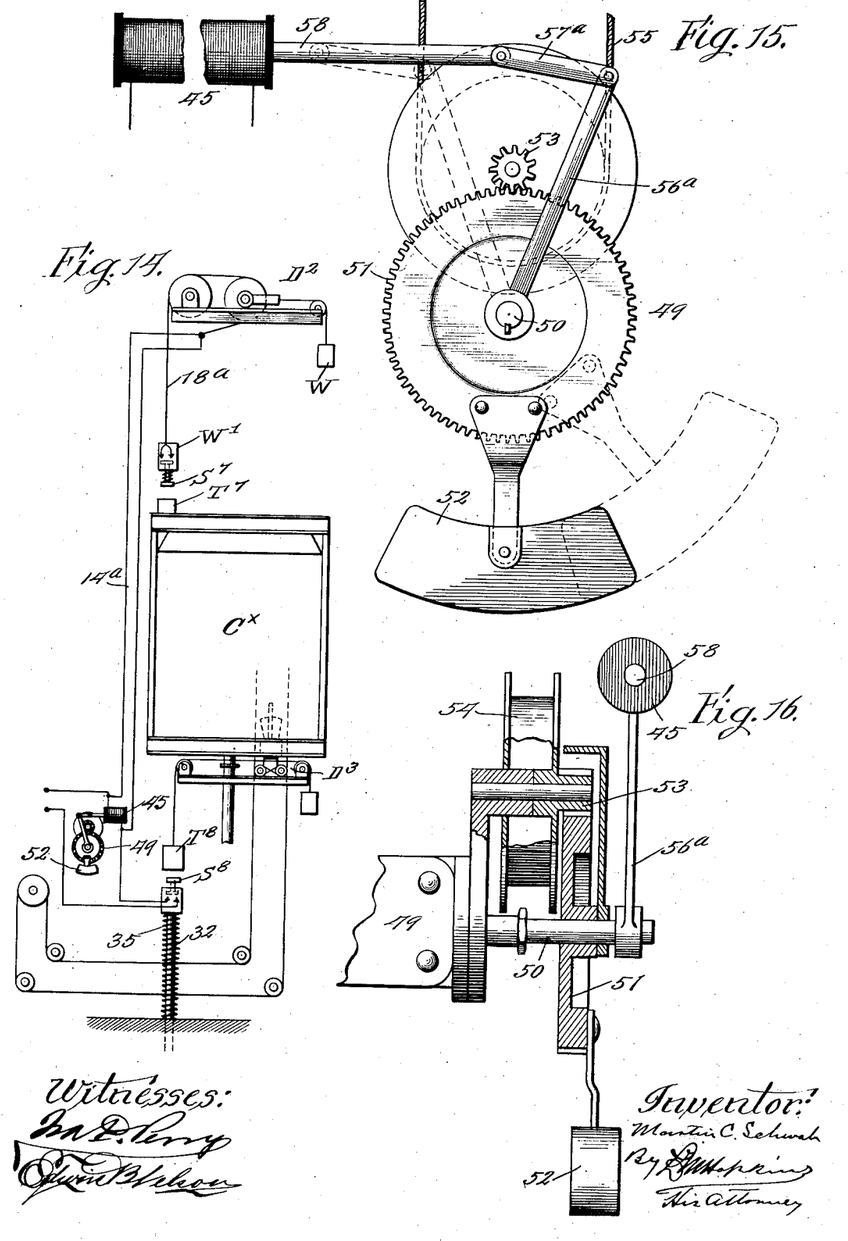
Fig. 14 is a diagrammatic elevation of a single hydraulically operated and controlled car showing the application of the invention under another modification, to only the limit-stop mechanism.
Figs. 15 and 16, are respectively an end elevation and an axial section on a larger scale, of a limit-stop valve of a hydraulic elevator, such as is now in common use.

In Fig. 14, the invention is shown in its application to the top and bottom limit stops of a single car $C^x$. The stopping of the car at each of its limits is accomplished by completing a circuit $14^a$ through the solenoid 45 whereby the valve 49 is operated. This circuit has a pair of contacts carried by a weight W′ which is supported by a cable $18^a$ and differential take-up mechanism $D^2$ constructed and arranged precisely like that shown in Figs. 1 and 3. The weight carries a switch $S^7$ which is adapted to close the circuit $14^a$ when it is struck by a tappet $T^7$ on the top of the car. For stopping the car at its bottom limit mechanism like that at the top of Fig. 11 is used. A switch $S^8$ is supported by the post 32 and arranged in the path of a weight $T^8$ forming a tappet, said weight being suspended from the bottom of the car by take-up mechanism $D^3$.

The herein described stops for stopping the car at its top and bottom limits, where only a single car is operated in a single shaft, or for stopping the upper car at its top limit and the bottom car at its lower limit, where two cars are operated in one and the same shaft are not intended to, and do not operate at each ascent and descent of the car for stopping it with its floor flush with the top and bottom landings, and thus relieving the operator of his duty to do so, but are supposed to and do operate in the event of his failure to stop the car at the landings. They operate by temporarily putting the vital parts of the controller out of his control and shifting them to "stop" positions, so that they automatically cause the car to be stopped, while at the same time leaving it possible for him to reëstablish his control over the controller, so that he may again start the car in the proper direction. They are not intended to supersede the final limit stops, that are now customarily used on all electric elevators, but are auxiliary thereto and are arranged to operate in advance of said final limit stops, so that if the limit stops herein described fail to operate, the final limit stops, being in reserve, will with absolute certainty, stop the car when they are tripped and will put the car absolutely beyond the control of the operator until they are reset by the engineer. These final limit stops, customarily used, are not shown in the drawings because they are well understood by those skilled in the art, a peculiarity of them being a trip which when once operated must be reset manually.

The limit stops herein described are particularly valuable on elevators having a single car operating in a single shaft, and I prefer to construct them as herein shown and described, but they may be used on elevators having a plurality of cars operating in a single shaft and they may be variously constructed and still be within the scope of my invention, because I believe myself to be the first to provide means of any construction for automatically stopping an elevator car through the medium of the controller.

What I claim as new and desire to secure by Letters Patent, is—

1. In an elevator apparatus, the combination with two cars movable both upward and downward in the same shaft, and means for independently operating them, of a device arranged between the cars and adapted to extend directly from one to the other when the cars are at a predetermined distance apart, and means operated by said device for stopping the upper car going down when the cars approach each other to within said predetermined distance apart, said means including a circuit having a switch adapted to be operated by said device, an electro-receptive device included in said circuit and means operated by said electro-receptive device for stopping the car.

2. In an elevator apparatus, the combination with two cars movable both upward and downward in the same shaft and means for independently operating them, of co-operating devices carried by the cars and adapted to engage each other when the cars are at a predetermined distance apart, and means operated by said devices when engaged for stopping the upper car going down and the lower car going up on their approach to within said predetermined distance apart, one of said devices being suspended from its car by a cable.

3. In an elevator apparatus, the combination with two cars movable both upward and downward in the same shaft and means for independently operating them, of co-operating devices carried by the cars and adapted to engage each other when the cars are at a predetermined distance apart, and means operated by said devices when engaged for stopping the upper car going down and the lower car going up upon their approach to within said predetermined distance apart, one of said devices being suspended from its car by a cable and differential mechanism for taking up the slack in the cable.

4. In an elevator apparatus, the combination with two cars movable both upward and downward in the same shaft and a means for independently operating them, of co-operating devices carried by the cars and adapted to engage each other when the cars are at a predetermined distance apart, and means including electric circuit switches in said circuits adapted to be closed by the engagement of said devices, electro-receptive devices in said circuits and means operated by said electro-receptive devices for stopping the upper car going down and the lower car going up upon their approach to within said predetermined distance apart.

5. In an elevator apparatus, the combination with two cars movable both upward and downward in the same shaft and means for independently operating them, of co-operating devices carried by the cars and adapted to engage each other when the cars are at a predetermined distance apart, and means including an electric circuit on each car, a switch in said circuit, adapted to be closed by the engagement of said devices, an electro-receptive device in said circuit and means operated by said electro-receptive device for stopping the upper car going down and the lower car coming up upon their approach to within said predetermined distance apart.

6. In an elevator apparatus, the combination of two cars movable both upward and downward in the same shaft, and means for independently operating them, of co-operating devices carried by the cars and adapted to engage each other when the cars are at a predetermined distance apart, and means including electric circuits, switches in said circuits adapted to be closed by the engagement of said devices, circuit breakers in said circuit, electro-receptive devices in said circuits and means operated by said electro-receptive devices for stopping the upper car going down and the lower car going up on their approach to within a predetermined distance apart.

7. In an elevator apparatus the combination with two cars movable both upward and downward in the same shaft and means for independently operating them, of co-operating devices carried by the cars and adapted to engage each other when the cars are at a predetermined distance apart, and means including an electric circuit on each car, a switch in said circuit adapted to be closed by the engagement of said devices, a circuit breaker in said circuit, an electro-receptive device in said circuit, and means operated by said electro-receptive device for stopping the upper car going down and the lower car going up upon their approach to within said predetermined distance apart.

8. In an elevator apparatus, the combination with two cars movable both upward and downward in the same shaft, and means including a controller on each car, for independently operating them, of coöperating devices carried by the cars and adapted to engage each other when the cars reach a predetermined distance apart, and means operated by said devices when in engagement, for stopping the upper car going down and the lower car going up, through the medium of the controller.

9. In an elevator apparatus, the combination with two cars movable both upward and downward in the same shaft, and means including a controller, on each car, for independently operating them, of coöperating devices carried by the cars and adapted to engage each other when the cars reach a predetermined distance apart, and means operated by said devices when in engagement for rendering the controller-lever inoperative, and means for automatically returning the controller shaft to "stop" position.

10. In an elevator apparatus, the combination with two cars movable both upward and downward in the same shaft, and means including a controller, on each car, for independently operating them, of coöperating devices carried by the cars and adapted to engage each other when the cars reach a predetermined distance apart, and means operated by said devices when in engagement for disconnecting the controller-lever from its shaft, and means for returning the controller shaft to "stop" position.

11. In an elevator apparatus, the combination with two cars movable both upward and downward in the same shaft, and means including a controller on each car, for independently operating them, of coöperating devices carried by the cars and adapted to engage each other when the cars reach a predetermined distance apart and means, including electric circuits, switches in said circuits adapted to be closed by the engagement of said devices, electro-receptive devices in said circuits and means operated by said electro-receptive devices, for operating the controller and stopping the upper car going down and the lower car going up.

12. In an elevator apparatus, the combination with two cars movable both upward and downward in the same shaft, and means including a controller, on each car, for independently operating them, of coöperating devices carried by the cars and adapted to engage each other when the cars reach a predetermined distance apart, and means including an electric circuit on each car, a switch in said circuit adapted to be closed by the engagement of said devices, an electro-receptive device in said circuit and means operated by said electro-receptive device for operating the controller and stopping the upper car going down and lower car going up.

13. In an elevator apparatus the combination with two cars movable both upward and downward in the same shaft, and means including a controller, on each car, for independently operating them, of coöperating devices carried by the cars and adapted to engage each other when the cars reach a predetermined distance apart, and means including electric circuits, switches included in said circuits adapted to be closed by the engagement of said devices, circuit breakers in said circuits, and electro-receptive devices for operating the controllers.

14. In an elevator apparatus, the combination with two cars movable both upward and downward in the same shaft, and means including a controller, on each car, for independently operating them, of coöperating devices carried by the cars and adapted to engage each other when the cars reach a predetermined distance apart, of means including a circuit on each car, a switch in each of said circuits, adapted to be closed by the engagement of said parts, a circuit breaker in each of said circuits, electro-receptive devices, and means operated by said electro-receptive devices for operating the controllers.

15. In an elevator apparatus the combination with two cars movable both upward and downward in the same shaft, and means for independently operating them, of coöperating devices carried by the cars and adapted to engage each other when the cars are at a predetermined distance apart, mechanism operated by the engagement of said devices for stopping the upper car going down and the lower car going up, and means for preventing said stopping mechanism from operating when the lower car is at its lower limit.

16. In an elevator apparatus the combination with two cars movable both upward and downward in the same shaft and means for independently operating them, of coöperating devices carried by the cars and adapted to engage each other when the cars are at a predetermined distance apart, mechanism operated by the engagement of said devices for stopping the upper car going down and the lower car going up, and means for preventing the engaging of said devices when the lower car is at its lower limit.

17. In an elevator apparatus, the combination with two cars movable both upward and downward in the same shaft, means for independently operating them, and a signaling device carried by each car, of coöperating devices carried by the cars, respectively, and adapted to engage each other when the cars are at a predetermined distance apart, and means operated by said coöperating devices when engaged for operating said signals, one of said coöperating devices being adapted to recede, relatively to the car which carries it, when engaged by the other of said devices.

18. In an elevator apparatus, the combination with two cars movable both upward and downward in the same shaft, and means for operating them, of coöperating devices carried by the cars and adapted to engage each other when the cars at at a predetermined distance apart, and means operated by said devices when engaged for stopping the upper car going down and the lower car going up upon their approach to within said predetermined distance apart, one of said devices being adapted to recede, when engaged to permit the continued movement of the car, and a signal on each car operated by said devices.

19. In an elevator apparatus, the combination with two cars movable both upward and downward in the same shaft and means for operating them, of coöperating devices adapted to engage each other when the cars are at a predetermined distance apart, means operated by said devices when engaged for stopping the upper car going down and the lower car going up upon their approach to within said predetermined distance apart, a cable depending from one of said cars and supporting one of said devices, and mechanism for taking up the slack in the cable.

20. In an elevator apparatus, the combination with two cars movable both upward and downward in the same shaft, and means for operating them, of coöperating devices adapted to engage each other when the cars are at a predetermined distance apart, means operated by said devices when brought into engagement with each other for stopping the upper car going down and the lower car going up upon their approach to within a predetermined distance apart, a cable depending from one of said cars and supporting one of said devices, and differential mechanism for taking up the slack in the cable.

21. In an elevator apparatus, the combination with two cars, movable both upward and downward in the same shaft, and means for operating them, of coöperating devices carried by the cars and adapted to engage each other when the cars are at a predetermined distance apart, and means including electric circuits, having switches adapted to be closed by the engagement of said devices, electro-receptive devices in said circuits, and means operated by said electro-receptive devices for stopping the upper car going down and the lower car going up upon their approach to within a predetermined distance apart.

22. In an elevator apparatus the combination with two cars movable both upward and downward in the same shaft, and means for operating them, of coöperating devices carried by the cars and adapted to engage each other when the cars are at a predetermined distance apart, and means including an electric circuit on each car, having a switch adapted to be closed by the engagement of said devices, an electro-receptive device in said circuit, and means operated by said electro-receptive device for stopping the upper car going down and the lower car going upon their approach to within a predetermined distance apart.

23. In an elevator apparatus the combination with two cars movable both upward and downward in the same shaft and means for operating them, of coöperating devices carried by the cars and adapted to engage each other when the cars are at a predetermined distance apart, and means including an electric circuit on each car, having a switch adapted to be closed by the engagement of said devices, a circuit breaker in said circuit, an electro-receptive device in said circuit, and means operated by said electro-receptive device for stopping the upper car going down and the lower car going up upon their approach to within a predetermined distance apart.

24. In an elevator apparatus, a plurality of independently supported cages, controlling devices connected with each cage, and means connected to travel with each cage at a distance therefrom to contact with and shift the controlling devices of an approaching cage to arrest the latter and constructed to release said controlling devices and restore them to their former conditions as the cage approached resumes its movement.

25. In an elevator apparatus the combination with two cars movable both upward and downward in the same shaft, and means for independently operating them, of coöperating devices carried by the cars and adapted to engage each other when the cars are at a predetermined distance apart, one of the said devices being adapted to recede relatively to the car carrying it, electric circuits having switches adapted to be closed by the engagement of said devices, electro-receptive devices in said circuits, and means operated by said electro-receptive devices for stopping the upper car going down and the lower car going up when they approach each other to within said predetermined distance apart.

26. In an elevator apparatus the combination with two cars movable both upward and downward in the same shaft, and means for independently operating them, of coöperating devices carried by the cars and adapted to engage each other when the cars are at a predetermined distance apart, one of said devices being adapted to recede relatively to the car carrying it, an electric circuit on each car having a switch adapted to be closed by the engagement of said devices, electro-receptive devices in said circuit, and means operated by said electro-receptive devices for stopping the upper car going down and the lower car going up when they approach each other to within said predetermined distance apart.

27. In an elevator apparatus the combination with two cars movable both upward and downward in the same shaft, and means for independently operating them, of coöperating devices carried by the cars and adapted to engage each other when the cars are at a predetermined distance apart, one of said devices being adapted to recede relatively to the car carrying it and means including electric circuits having switches adapted to be closed by the engagement of said devices, electro-receptive devices in said controllers in said circuits, and means operated by said electro-receptive devices for operating the controllers and stopping the upper car going down and the lower car going up when the cars approach to within a predetermined distance apart.

28. In an elevator apparatus the combination with two cars movable both upward and downward in the same shaft, and means including controllers for operating them, of coöperating devices carried by the cars and adapted to engage each other when the cars are at a predetermined distance apart, electric circuits having switches, adapted to be closed by the engagement of said devices, and electro-receptive devices in said circuits arranged in operative relation to the controllers for stopping the upper car going down and the lower car going up through the medium of the controllers.

29. In an elevator apparatus the combination of two cars movable both upward and downward in the same shaft, and means including a controller on each car for independently operating them, of coöperating devices carried with the cars and adapted to engage each other when the cars are at a predetermined distance apart, electric circuits having switches adapted to be closed by the engagement of said devices, electro-receptive devices in said circuits, and means operated by said electro-receptive devices for disconnecting the controlling levers from their shafts.

30. In an elevator apparatus, the combination of two cars movable both upward and downward in the same shaft and means for independently operating them, of a weight suspended from the upper car and depending a predetermined distance therefrom, said weight being adapted to recede relatively to the upper car, and means operated by the weight for stopping the upper car going down and the lower car going up upon their approach to within said predetermined distance apart.

31. In an elevator apparatus the combination with two cars movable both upward and downward in the same shaft and means for independently operating them, of a weight suspended from the upper car and depending a predetermined distance therefrom, said weight being adapted to recede relatively to the upper car, electric circuits having switches adapted to be closed by said weight when engaged, electro-receptive devices in said circuits and means operated by said electro-receptive devices for stopping the upper car going down and the lower car going up upon their approach to within said predetermined distance apart.

32. In an elevator apparatus the combination with two cars movable both upward and downward in the same shaft and means including controllers for operating them, of a weight suspended from the upper car and depending a predetermined distance therefrom, electric circuits having switches adapted to be closed by said weight when engaged by the approach of the cars to within said predetermined distance apart, electro-receptive devices in said circuits, means controlled by said electro-receptive devices for disconnecting the controller levers, and means for returning the controller shafts to "stop" position.

33. In an elevator apparatus the combination with two cars movable both upward and downward in the same shaft, and means for independently operating them, of a weight suspended from the upper car, and depending a predetermined distance therefrom, said weight being capable of receding relatively to the upper car, switches carried by the weight and lower car respectively and adapted to be engaged and operated by the lower car and weight, respectively, and electric circuits including sad switches, electro-receptive devices in said circuits and means operated by said electro-receptive devices for stopping the upper car going down and the lower car going up when said cars approach to within said predetermined distance apart.

34. In an elevator apparatus the combination of two cars movable both upward and downward in the same shaft, and means for independently operating them, of a weight, a cable from which it is suspended from the upper car and depending at a predetermined distance therefrom, said weight being capable of receding relatively to the upper car, take-up mechanism for the suspension cable, switches carried by the weight and lower car respectively, tappets carried by the weight and lower car and adapted to engage said switches, electric circuits including said switches and electro-receptive devices in said circuits, and means operated by said electro-receptive devices for stopping the upper car going down and the lower car going up when they approach to within said predetermined distance apart.

35. In an elevator apparatus the combination of two cars movable both upward and downward in the same shaft and means for independently operating them, of a weight, a cable by which it is suspended from the upper car at a predetermined distance therefrom, said weight being capable of receding relatively to the upper car, means for stopping the upper car going down and the lower car going up when said cars approach to within said predetermined distance apart, a rod movable vertically relatively to the lower car and means for moving said rod upward revatively to the lower car when the lewer car is approaching its lower limit, said rod being adapted to arrest the downward movement of the weight when the lower car is at its lower limit.

36. In an elevator apparatus, the combination with two cars movable both upward and downward in the same shaft, and means for independently operating them, of a weight, a cable suspending it from the upper car at a predetermined distance therefrom, means operated by the engagement of said weight for stopping the upper car going down and the lower car going up when the lower car is above its lower limit, and means for stopping the upper car going down when it reaches its lower limit.

MARTIN C. SCHWAB.

Witnesses:
C. M. WILKINSON,
G. F. JEDLICKA.